W. H. HOLLOPETER.
MILLING AND GRINDING ATTACHMENTS FOR MACHINE LATHES.
APPLICATION FILED MAY 13, 1916.
1,263,671.
Patented Apr. 23, 1918.
2 SHEETS—SHEET 1.
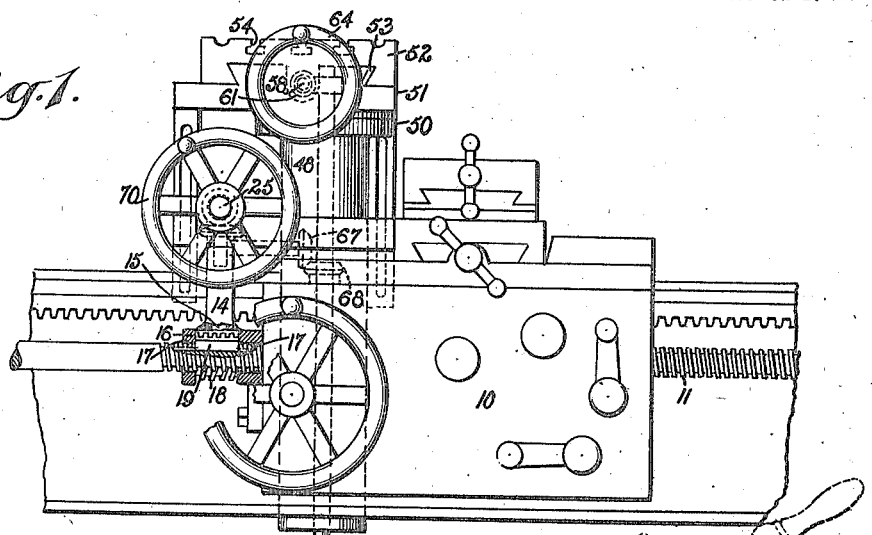
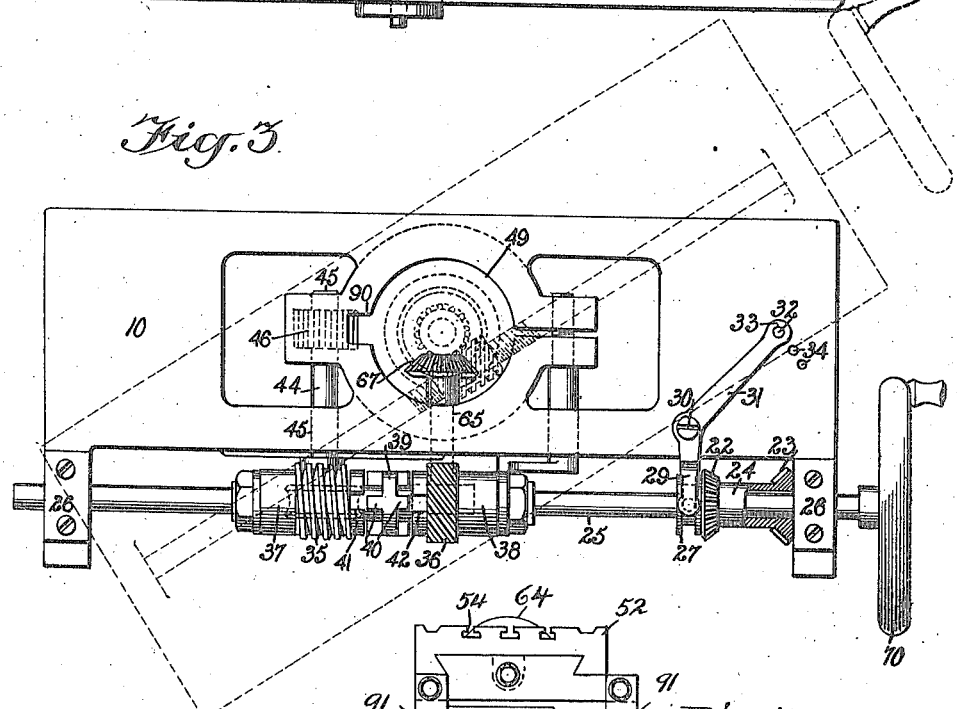
WITNESSES
INVENTOR
W. H. Hollopeter
BY
ATTORNEYS W. H. HOLLOPETER.
MILLING AND GRINDING ATTACHMENTS FOR MACHINE LATHES.
APPLICATION FILED MAY 13, 1916.
1,263,671.
Patented Apr. 23, 1918.
2 SHEETS—SHEET 2.
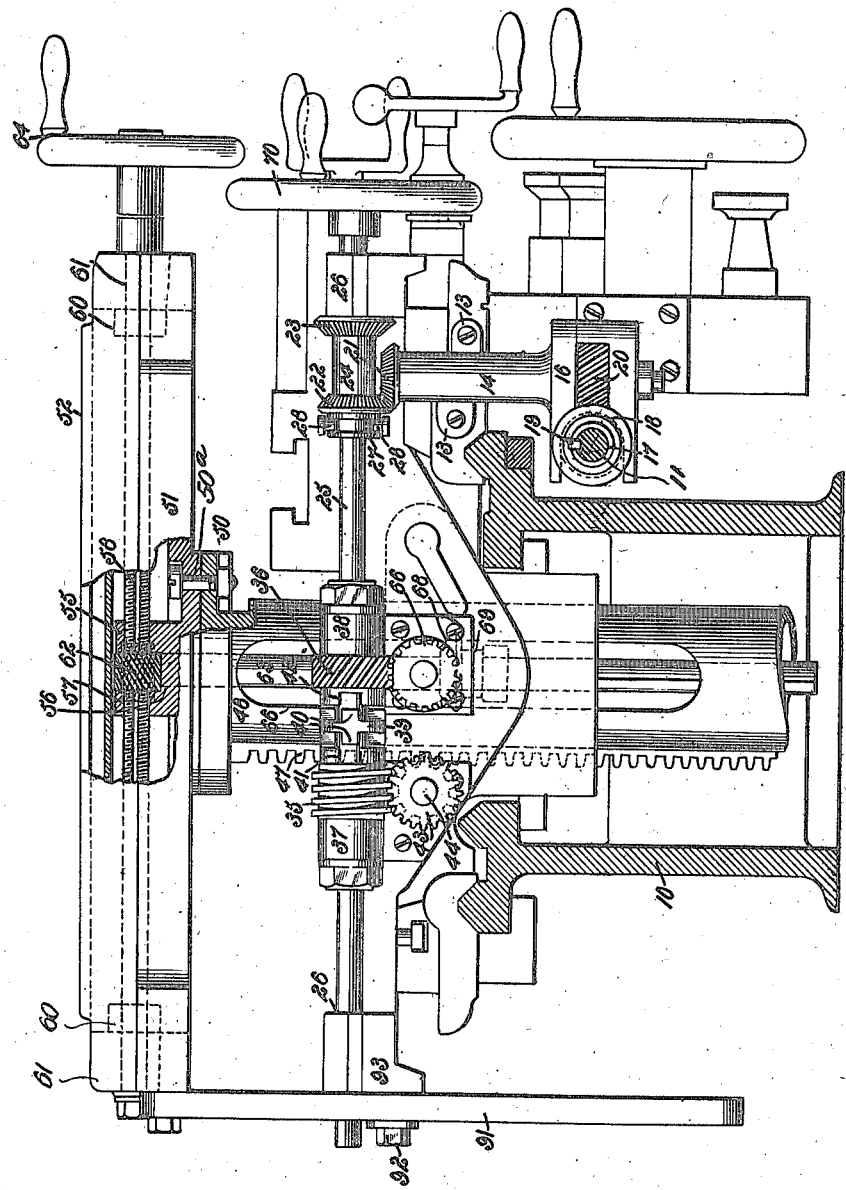
WITNESSES
INVENTOR
W. H. Hollopeter
BY
ATTORNEYS

UNITED STATES PATENT OFFICE.

WILLIAM H. HOLLOPETER, OF BURNS, OREGON.

MILLING AND GRINDING ATTACHMENT FOR MACHINE-LATHES.

1,263,671.  Specification of Letters Patent.  Patented Apr. 23, 1918.

Application filed May 13, 1916. Serial No. 97,284.

*To all whom it may concern:*

Be it known that I, WILLIAM H. HOLLOPETER, a citizen of the United States, and a resident of Burns, in the county of Harney and State of Oregon, have invented a new and Improved Milling and Grinding Attachment for Machine-Lathes, of which the following is a full, clear, and exact description.

My invention has for its object to provide a milling and grinding attachment for lathes provided with vertical and transverse manual and automatic feeds in addition to the longitudinal feed, either automatic or manual.

Additional objects of the invention will appear in the following specification, in which the preferred form of the invention is disclosed.

In the drawings, similar reference characters denote similar parts in all the views, in which—

Figure 1 is a view partly in section illustrating a portion of a lathe provided with my improvement;

Fig. 2 is an enlarged view partly in section, showing a portion of the carriage with which the lathe is provided;

Fig. 3 is a plan view showing the means for rotating the vertical shaft mounted in the hollow column, as well as other features of the invention; and Fig. 4 is a view showing in elevation the left side of Fig. 2.

By referring to the drawings, it will be seen that a lathe is provided with a carriage 10 which is advanced by a lead screw 11 in the customary manner. To this carriage 10 there is secured by brackets 13 a bearing 14 in which a vertical shaft 15 is journaled, the bearing 14 having an enlargement 16 at its lower end, provided with openings 17 through which the lead screw 11 extends, a gear 18 being mounted on the lead screw 11 and being keyed thereto by a feather 19, so that it will rotate therewith. This gear 18 meshes with a gear 20 on the bottom of the shaft 15 for rotating the said shaft 15. The upper end of the shaft 15 is provided with a bevel gear 21 which is adapted to mesh with a bevel gear 22 or a bevel gear 23, these two bevel gears 22 and 23 being disposed at opposite sides of the bevel gear 21, and being mounted on a sleeve 24 which is keyed to a shaft 25 journaled in bearings 26 on the carriage. It will be understood that the sleeve 24 may be slid on the shaft 25, so that either the bevel gear 22 or the bevel gear 23 will mesh with the bevel gear 21. In order to accomplish this, the sleeve 24 is provided with an annular groove 27 in which studs 28 on a bifurcated arm 29 are disposed, the arm 29 being fulcrumed at 30 to the carriage, and it being possible to move the arm 29 by a companion arm 31, in a manner readily understood. There are three positions for the sleeve 24, one at which the bevel gear 22 meshes with the bevel gear 21; a second position where the two bevel gears 22 and 23 are out of mesh with the bevel gear 21, and a third position where the bevel gear 23 meshes with the bevel gear 21. These three positions are provided for, it being possible by means of a pin 32, which projects through an opening 33 in the arm 31, to hold the arm 31 and consequently the sleeve 24 in any one of these positions, the pin 32 projecting into one of three orifices 34 for this purpose.

Rotatably mounted on the shaft 25 is a worm 35 and a worm-wheel 36, the worm 35 having a hub journaled in a bearing 37 extending from the carriage, and the worm-wheel 36 having a hub journaled in a bearing 38 extending from the carriage. Disposed between the worm 35 and the worm-wheel 36 there is a clutch member 39 keyed to the shaft 25 and having projections 40 for extending into the recesses 41 of the worm 35, or recesses 42 in the worm-wheel 36. It will, therefore, be seen that by moving this clutch member 39, either the worm 35 or the worm-wheel 36 may be rotated with the shaft 25. The worm 35 is in mesh with a worm-wheel 43 mounted on a shaft 44 journaled in bearings 45 in the carriage, this shaft 44 also carrying a gear 46 which meshes with a rack 47 extending from a column 48 which is disposed through an opening 49, it being possible to raise or lower the column 48 by the means described, in connection with the gear 46 and the rack teeth 47.

The column 48 is provided with a head 50 on which a guide 51 is mounted, it being possible to rotate the guide 51 to the position desired, and secure the said guide 51 to the head 50 by means of bolts 50ª. The adjustment of the guide 51 in a new position is shown by the dotted lines in Fig. 3 of the drawings, the links 91 being removed. Disposed on the guide 51 for moving horizontally relatively thereto, is a table 52, the table 52 and the guide 51 being connected by a guide and guideway 53, or by any other suitable means permitting the horizontal movement of the table 52 relatively to the guide. The table 52 is provided with T-slots 54 or other means for securing the material thereto.

Extending up from the guide 51 there is a projection 55 having a bearing with a vertical axis 56, and a threaded opening 57 with a horizontal axis. A threaded shaft 58 meshes in the threaded opening 57. To this shaft 58 there is feathered a worm-wheel 62 which meshes with a worm secured to a vertical shaft 63 journaled in the bearings 56. The worm-wheel is prevented from longitudinal movement by the projection 55 extending at each side. When the shaft 58 is rotated, it will move, carrying the table 52 transversely of the carriage, in a manner well understood. As a means of moving the table 52 by hand, the shaft 58 is provided with a hand wheel 64, but it is also possible to move the table 52 transversely of the carriage automatically, for there is a shaft 65 disposed through a slot 66 in the hollow column 48, the shaft 65 being journaled in a bearing in the carriage and having a gear 66 which meshes with the worm-wheel 36. This shaft 65 carries a bevel gear 67 which meshes with a bevel gear 68 which is keyed to the shaft 63 and which is journaled in a bearing 69 extending from the carriage frame through the slot 66. The shaft 58 is provided with collars 60 which abut against the bearings 61, on the table 52 in which the shaft 58 is journaled.

Inasmuch as the shaft 25 may be rotated in either direction by the lead screw 11 and through the gearing which has been described, it will be seen that the table 52 carried by the column 48, may be raised or lowered automatically, and it will also be seen that the table 52 may be moved transversely in either direction, and automatically by the said lead screw through the gearing provided therefor. It will also be seen that the table 52 may be moved transversely manually by means of the hand-wheel 64. A hand-wheel 70 is secured to the shaft 25, so that when desired, the table 52 may be raised or lowered manually.

The column 48 is prevented from rotating by its rack 47 which is disposed in the carriage 10. After the position of the guide 51 is adjusted vertically, it may be held in place by slotted links 91 which are bolted to the guide 51, bolts 92 being disposed in the slots in the links and meshing in threaded openings in the carriage 10 at 93, in a manner understood.

Having thus described my invention, what I claim as new and desire to protect by Letters Patent, is:

1. In a milling and grinding attachment for machine lathes, a carriage having an opening, a hollow column disposed through the opening, a guide secured to the top of the column and having a vertical bearing and a horizontal threaded opening, a table movable on the guide and provided with a bearing, a threaded shaft meshing in the horizontal threaded opening and journaled in bearings in the table, a shaft disposed in the column and journaled in the vertical bearing, and means by which the second shaft is adapted to rotate the threaded shaft.

2. In a milling and grinding attachment for machine lathes, a carriage having an opening, a hollow column disposed through the opening, a guide secured to the top of the column and having a vertical bearing and a horizontal threaded opening, a table movable on the guide and provided with a bearing, a threaded shaft meshing in the horizontal threaded opening and journaled in bearings in the table, a shaft disposed in the column and journaled in the vertical bearing, a gear keyed to the threaded shaft, and a gear on the second shaft meshing with the first gear.

3. In a milling and grinding attachment for machine lathes, a carriage having an opening through its upper portion, a vertical column with a head and a rack, a shaft journaled in bearings in the carriage, gearing connecting the shaft with the teeth of the rack, a table adjustable on the head, and means for securing the table to the head, in adjustable position.

4. In a milling and grinding attachment for machine lathes, a carriage having an opening through its upper portion, a vertical column disposed through the opening and provided with a head and a rack, a shaft journaled in bearings in the carriage, gearing connecting the shaft with the teeth of the rack for the purpose specified, a table movable relatively to the head, and means connecting the head with the carriage for holding the head in vertical adjusted position.

5. In a milling and grinding attachment for machine lathes, a carriage having a vertical opening through its upper portion, a vertical column disposed through the opening, a shaft journaled in bearings in the carriage, two gears rotatably mounted on the shaft, a table movable relatively to the column, gearing connecting one of the first gears with the column for moving the latter, gearing connecting the other of the first gears with the table for moving the latter, means keyed to the shaft and adapted to engage either of the first two gears for rotating the gear engaged with the shaft, and means for rotating the shaft.

6. In a milling and grinding attachment for machine lathes, a carriage having a vertical opening through its upper portion, a vertical column disposed through the opening, rack teeth on the column, a shaft journaled in bearings in the carriage, two gears rotatably mounted on the shaft, a table movable relatively to the column, another shaft, two gears on the second shaft one meshing with the rack teeth and the other meshing with one of the first two gears, gearing connecting the other of the first two gears with the table for moving the latter, means keyed to the shaft and adapted to engage either of the first two gears for rotating the gear so engaged with the shaft, and means for rotating the first mentioned shaft.

7. In a milling and grinding attachment for machine lathes, a carriage having an opening with a vertical axis, a hollow column extending through the opening, means for moving the column vertically relatively to the carriage, a table disposed for moving relatively to the top of the column, a shaft in the hollow column, gearing connecting the shaft with the table for moving the latter relatively to the column, there being a slot in the column, a shaft extending through the slot, gearing connecting the two shafts, and means for rotating the second shaft.

8. In a milling and grinding attachment for machine lathes, a carriage having a vertical opening through its upper portion, a hollow column disposed through the opening, a shaft journaled in bearings in the carriage, two gears rotatably mounted on the shaft, a table mounted on and movable relatively to the column, gearing connecting one of the first gears with the column for moving the latter, a shaft in the hollow column, gearing connecting the second shaft with the table for moving the latter relatively to the column, there being a slot in the column, a third shaft extending through the slot, gearing connecting the second and the third shafts, gearing connecting the third shaft with the other of the two gears mounted on the first shaft, means keyed to the first shaft and adapted to engage either of the first two gears for rotating the gear so engaged with the first shaft, and means for rotating the first shaft.

9. In a milling and grinding attachment for machine lathes, a carriage having an opening, a hollow column disposed through the opening, a table disposed over the column and movable relatively thereto, a shaft, means by which the shaft is adapted to move the table relatively to the column, a gear keyed to the shaft, a shaft disposed in the column, a gear on the second shaft meshing with the gear on the first shaft and means to move the hollow column relatively to the carriage.

10. In a milling and grinding attachment for machine lathes, a carriage having an opening, a hollow column disposed through the opening, a guide secured to the top of the column and having a vertical bearing and a horizontal threaded opening, a table movable on the guide, a threaded shaft meshing with the threads in the horizontal opening, a shaft disposed in the hollow column and journaled in the vertical bearing, gearing connecting the two shafts, there being a slot in the side of the column, a third shaft extending through the slot, gearing connecting the second and the third shafts, and means for rotating the third shaft.

11. In a milling and grinding attachment for machine lathes, a carriage, a lead screw for advancing the carriage, a vertical bearing, a shaft journaled in the bearing, means by which the lead screw is adapted to rotate the shaft, a gear on the shaft, a second shaft, a sleeve keyed to the second shaft and having two gears spaced apart for engaging the first gear one at a time, a column movable vertically relatively to the carriage, and gearing connecting the second shaft with the column for moving the latter.

12. In a milling and grinding attachment for machine lathes, a carriage, a column carried thereby, a lead screw for advancing the carriage, a vertical bearing, a shaft journaled in the bearing, means by which the lead screw is adapted to rotate the shaft, a gear on the shaft, a second shaft, a sleeve keyed to the second shaft and having two gears spaced apart for engaging the first gear one at a time, a table movable relatively to the column, and gearing connecting the second shaft with the table for moving the latter.

13. In a milling and grinding attachment for machine lathes, a carriage, a lead screw for advancing the carriage, a vertical bearing, a shaft journaled in the bearing, means by which the lead screw is adapted to rotate the shaft, a gear on the shaft, a second shaft, a sleeve keyed to the second shaft and having two gears spaced apart for engaging the first gear one at a time, a column movable vertically relatively to the carriage, a table movable on the column, two gears rotatably mounted on the second shaft, means keyed to the second shaft for engaging either of the last two gears for rotating the gear engaged, means by which one of the gears is adapted to move the column, and means by which the other gear is adapted to move the table.

14. In a milling and grinding attachment for machine lathes, a carriage, a lead screw for advancing the carriage, a vertical bearing, a shaft journaled in the bearing, means by which the lead screw is adapted to rotate the shaft, a gear on the shaft, a second shaft, a sleeve keyed to the second shaft and having two gears spaced apart for engaging the first gear one at a time, a hollow column provided with a slot, two gears rotatably mounted on the second shaft, means keyed to the second shaft for engaging either of the last two gears for rotating the gear engaged, means by which one of the gears is adapted to move the column, a vertical shaft in the column, a table movable on the column, means by which the vertical shaft is adapted to move the table, a fourth shaft extending through the slot, gearing connecting the third and fourth shafts, and a gear on the fourth shaft with which the other of the two rotatably mounted gears on the second shaft meshes.

15. In a milling and grinding attachment for machine lathes, a carriage, a lead screw having means for advancing the carriage, a table, means for raising the table relatively to the carriage, and means operable by the lead screw for moving the table relatively to the carriage.

16. In a milling and grinding attachment for machine lathes, a carriage having an opening with a vertical axis, a hollow column extending through the opening, means for moving the column vertically relatively to the carriage, a table disposed for moving relatively to the top of the column, a shaft in the hollow column, gearing connecting the shaft with the table for moving the latter relatively to the column, there being a slot in the column, a shaft extending through the slot, gearing connecting the two shafts, means for rotating the second shaft, a third shaft, a clutch member keyed to the third shaft, and means for moving the clutch member into operative engagement with either of the said two means.

17. In a milling and grinding attachment for machine lathes, a carriage having an opening with a vertical axis, a column extending through the opening, means for moving the column vertically relatively to the carriage, a table disposed for moving relatively to the top of the column, means for moving the table relatively to the column, a shaft, a clutch member keyed to the shaft, and means for moving the clutch member into operative engagement with either of the said two means.

18. In a milling and grinding attachment for machine lathes, a carriage, a lead screw having means for advancing the carriage, a column, means for moving the column vertically relatively to the carriage, a table, means for moving the table relatively to the column, a shaft, a clutch member keyed to the shaft, means for moving the clutch member into operative engagement with either of the said two means, and means operable by the lead screw for rotating the shaft.

19. In a milling and grinding attachment for machine lathes, a carriage, a lead screw having means for advancing the carriage, a column, means for moving the column vertically relatively to the carriage, a table, means on the column for supporting the table, and means operable by the lead screw for operating the second mentioned means.

WILLIAM H. HOLLOPETER.

Witnesses:
CLIFFORD T. REED,
SIM C. SMITH.